US009895777B2

(12) United States Patent
Schallmeier et al.

(10) Patent No.: US 9,895,777 B2
(45) Date of Patent: Feb. 20, 2018

(54) AIR SPRING PISTON WITH INTEGRATED SEALING

(71) Applicant: Continental Automotive Systems, Inc., Auburn Hills, MI (US)

(72) Inventors: Christian Schallmeier, Lake Orion, MI (US); Ralf Pielock, Essel (DE); Sunny Makkar, Troy, MI (US); Garrett Mark Pniewski, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/880,730

(22) Filed: Oct. 12, 2015

(65) Prior Publication Data

US 2016/0102727 A1 Apr. 14, 2016

Related U.S. Application Data

(60) Provisional application No. 62/063,116, filed on Oct. 13, 2014.

(51) Int. Cl.
*B23P 15/10* (2006.01)
*B60G 11/27* (2006.01)
(Continued)

(52) U.S. Cl.
CPC .............. *B23P 15/10* (2013.01); *B60G 11/27* (2013.01); *B60G 15/14* (2013.01); *F16F 9/057* (2013.01);
(Continued)

(58) Field of Classification Search
CPC .......... F16F 9/368; F16F 9/084; F16F 9/3214; B23P 15/10; B30G 11/27; B30G 15/14
(Continued)

(56) References Cited

U.S. PATENT DOCUMENTS 4,555,096 A * 11/1985 Pryor .................... B60G 15/14
267/220
4,921,226 A * 5/1990 Pees .......................... F16F 9/38
267/64.21

(Continued)

FOREIGN PATENT DOCUMENTS

| DE | 102006008489 A1 | 8/2006 |
| DE | 102013204475 A1 | 1/2014 |
| JP | 2013044383 A * | 3/2013 |
| JP | 2013044384 A * | 3/2013 |
| WO | 2012054520 A1 | 4/2012 |

OTHER PUBLICATIONS

European Patent Office Search Report for Application 15189566.1 dated Mar. 22, 2016.

*Primary Examiner* — Melanie Torres Williams

(57) ABSTRACT

An air spring for air suspension system comprises a piston assembly and a damper assembly where the piston assembly is spaced apart from the damper assembly to at least partially define an air chamber. A seal is molded with piston walls to form an integrated piston assembly. The seal includes at least one sealing lip extending radially inward from the piston assembly at an angle that is non-perpendicular to an axis of the damper and the at least one sealing lip contacts the damper assembly when the piston assembly and the damper assembly are assembled together to seal the air chamber.

2 Claims, 3 Drawing Sheets

(51) Int. Cl.
*B60G 15/14* (2006.01)
*F16F 9/084* (2006.01)
*F16F 9/36* (2006.01)
*F16F 9/05* (2006.01)

(52) U.S. Cl.
CPC .............. *F16F 9/084* (2013.01); *F16F 9/369* (2013.01); *B60G 2202/152* (2013.01); *B60G 2204/1262* (2013.01); *B60G 2204/45021* (2013.01); *B60G 2206/82* (2013.01)

(58) Field of Classification Search
USPC .................................. 267/64.19, 64.27, 64.21
See application file for complete search history.

(56) References Cited

U.S. PATENT DOCUMENTS

| | | | | |
|---|---|---|---|---|
| 5,669,597 A | * | 9/1997 | Rittstieg | B60G 17/044 267/64.17 |
| 6,454,248 B2 | * | 9/2002 | Pradel | B60G 17/044 267/64.11 |
| 8,517,357 B2 | * | 8/2013 | Chapman | F16F 9/0454 267/64.21 |
| 2008/0106013 A1 | * | 5/2008 | Crabtree | F16F 9/38 267/64.27 |
| 2010/0102091 A1 | * | 4/2010 | Andersen | B65D 83/64 222/389 |

\* cited by examiner though a centrally arranged shock absorber, the same concept can be applied to a reverse air spring piston where the piston is arranged inside the damper.

AIR SPRING PISTON WITH INTEGRATED SEALING

CROSS REFERENCE TO RELATED APPLICATION

This application claims priority to U.S. Provisional Application No. 62/063,116 filed on Oct. 13, 2014.

TECHNICAL FIELD

The present disclosure relates to automotive vehicles and more particularly to suspension systems for automotive vehicles.

BACKGROUND

Suspension systems for automotive vehicles provide vehicle passengers with a more comfortable ride. Air suspension systems utilize air springs, rather than traditional coil springs. Air suspension systems provide different suspension qualities that may be preferable in some vehicles to traditional coil spring suspensions.

A conventional air spring is a device that is arranged between a vehicle body and chassis. The typical air spring has at least one working space that is filled with compressed air. Air spring pistons typically seal the air chamber against a hydraulic shock absorber (damper). This can be done in multiple ways. One common way is through use of an O ring.

In FIG. 1 a portion of a prior art air spring assembly 10 for a motor vehicle is shown. The air spring 10 has a centrally arranged shock absorber (damper) 14. A piston 12 surrounds the shock absorber 14 and is connected via the air spring cover (not shown) to the vehicle body. The shock absorber 14 is connected, via a connecting flange (not shown) to a wheel support of the chassis in the conventional manner.

The piston 12 and the shock absorber 14 are spaced apart to define an air chamber 16 therebetween. At one end an O-ring 22 seals the air chamber 16 from any air leakages. A c-ring 18 and a support ring 20 are located at one end of the shock absorber 14, between the shock absorber 14 and the piston 12 to support and secure the o-ring seal 22 in place. A groove 23 on the shock absorber 14 holds the c-ring 18 and support ring 20 to prevent axial movement along the shock absorber 14.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air spring for air suspension system comprises a piston assembly and a damper assembly where the piston assembly is spaced apart from the damper assembly to at least partially define an air chamber. A seal is molded with piston walls to form an integrated piston assembly. The seal includes at least one sealing lip extending radially inward from the piston assembly at an angle that is non-perpendicular to an axis of the damper and the at least one sealing lip contacts the damper assembly when the piston assembly and the damper assembly are assembled together to seal the air chamber.

A method of manufacturing a piston assembly, comprises forming a seal using an injection mold form and forming piston walls at least partially surrounding the seal with the injection molding form to create an integrated piston assembly. The piston is assembled to surround a damper assembly, such that an air chamber is at least partially defined by the piston assembly and the damper assembly. A sealing lip extends from the seal and is in contact with the damper assembly to seal the air chamber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
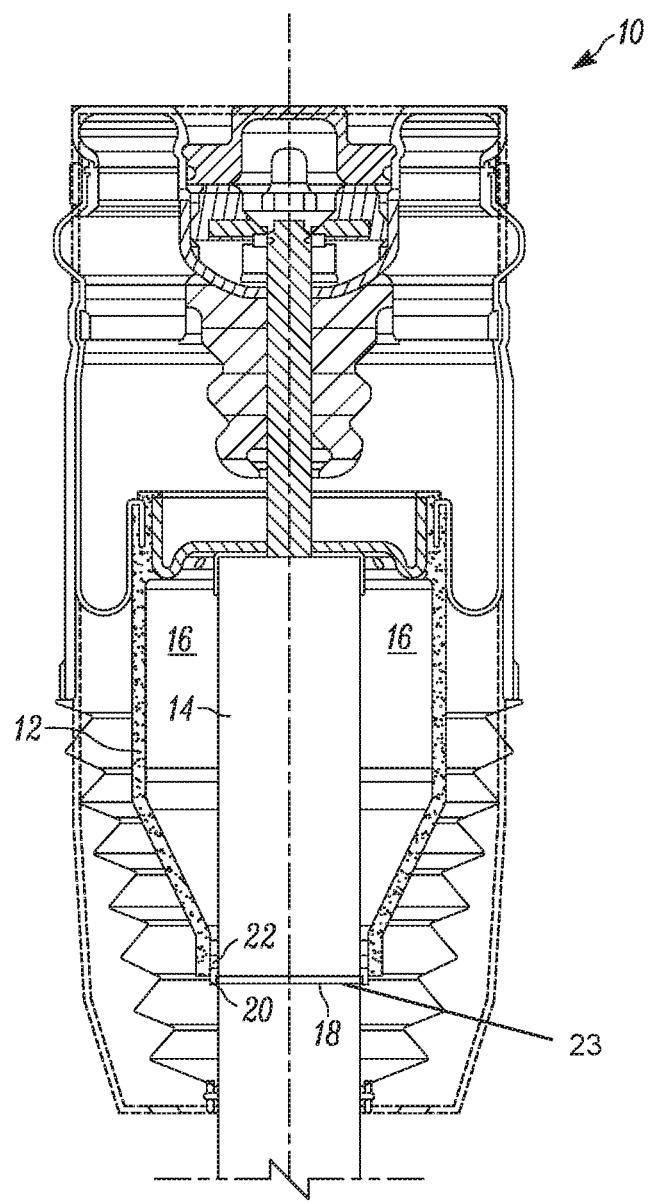
FIG. 1 is a schematic illustration of an air spring assembly of the prior art.
Figure 2:
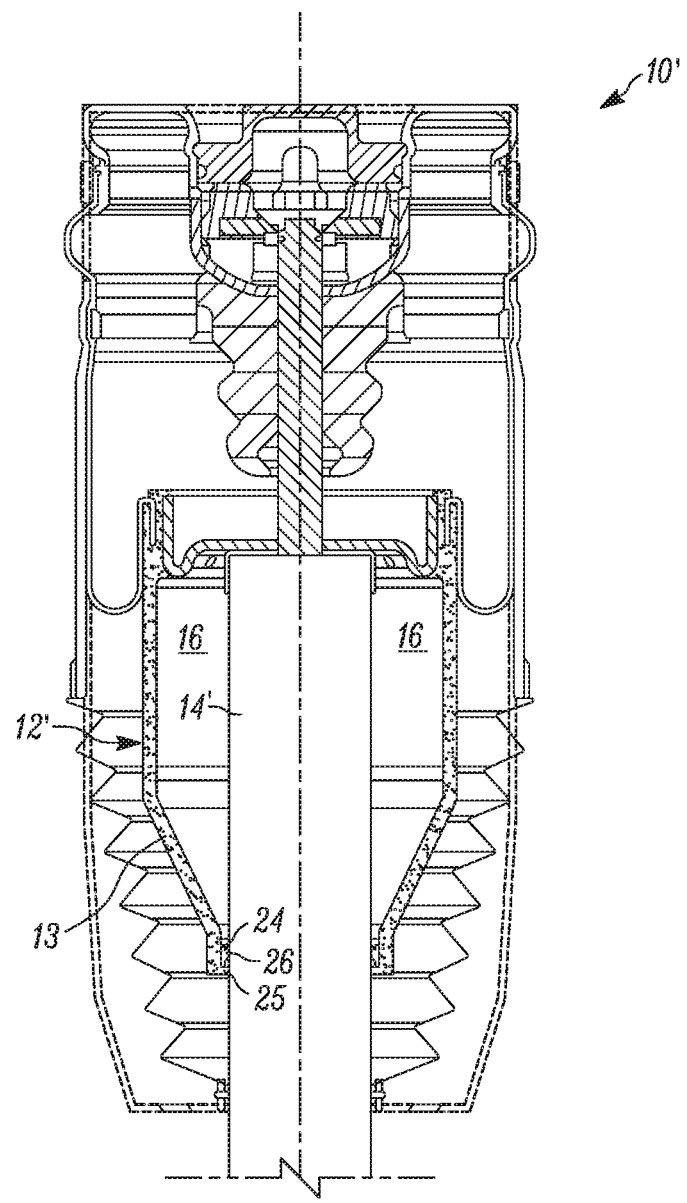
FIG. 2 is a schematic illustration of an air spring assembly of the present invention.
Figure 3:
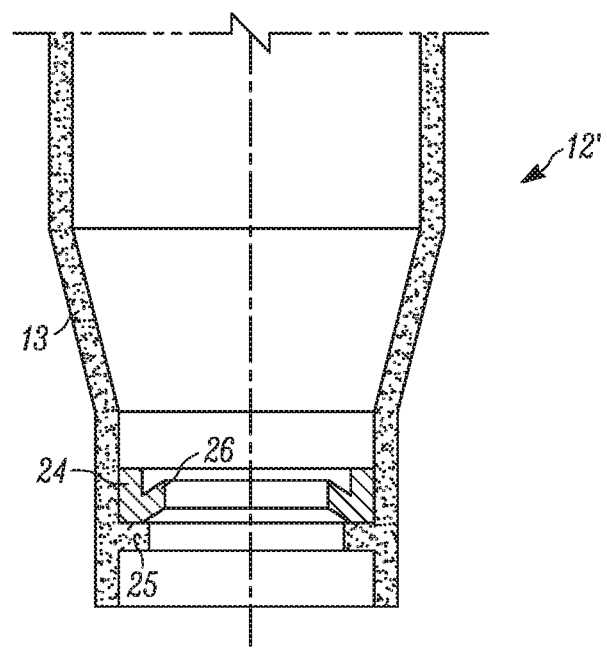
FIG. 3 is an enlarged schematic illustration of a cross-section of the piston and seal for the air spring assembly of FIG. 2.
Figure 4:
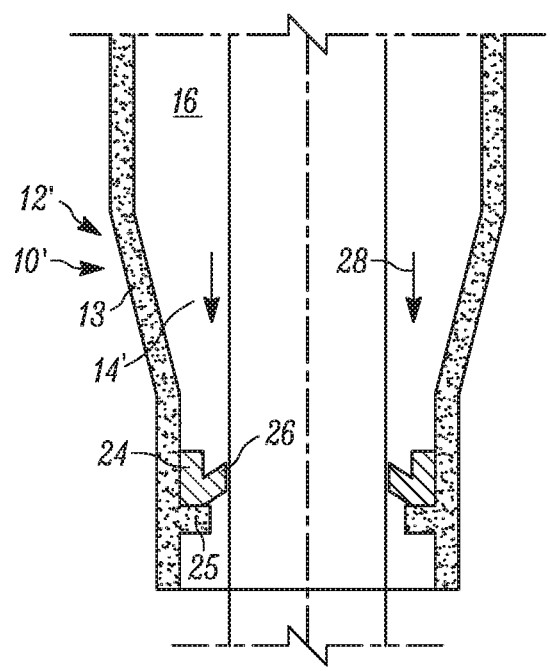
FIG. 4 is an enlarged schematic illustration of a cross-section of the piston, seal and damper for the air spring assembly of FIGS. 2-3.

The following description is merely exemplary in nature and is in no way intended to limit the disclosure, its application, or uses. For purposes of clarity, the same reference numbers will be used in the drawings to identify similar elements. Referring to FIGS. 2-4, an air spring assembly 10' for a motor vehicle is shown. The air spring 10' has a centrally arranged shock absorber (damper) 14'. A piston 12' surrounds the shock absorber 14' and is connected via the air spring cover (not shown) to the vehicle body. The shock absorber 14' is connected, via a connecting flange (not shown) to a wheel support of the chassis in the conventional manner.

The piston 12' and the shock absorber 14' are spaced apart to define an air chamber 16 therebetween. The piston assembly 12' of the present invention is made of plastic material molded with an integrated elastomeric seal 24. The seal 24 seals the air chamber 16 from any air leakages.

The sealing lip 26 extends radially inward from the piston 12'. The sealing lip 26 is formed to extend at a non-perpendicular angle. Therefore, when the piston 12' and the damper 14' are assembled together the sealing lip 26 extends upward toward the top of the piston 12' and damper 14'.

During operation of the vehicle, pressure within the air chamber 16 pushes downwardly and radially inward on the sealing lip 26, illustrated by arrow 28. In this manner, the sealing effect provided by the seal 24 increases as the pressure within the air chamber 16 increases and pushes the sealing lip 26 more securely against the damper 14'. Therefore, the seal 24 prevents any air leakages from the air chamber 16.

Additionally, the seal 24 shown has one sealing lip 26. However, multiple sealing lips 24 may be used to ensure proper sealing between the piston 12' and damper 14'. One skilled in the art would be able to determine the preferred number, size and angle of the sealing lip(s) 26 for a particular air spring assembly 10'.

The piston 12' is formed by plastic injection molding the seal 24 and the piston walls 13 to be an integrated component. The piston 12' is formed using a two-step injection molding process, where the seal is molded in the first step and then the piston walls 13 are molded in a second step creating the integrated piston 12'. Alternatively, the integrated piston 12' can be achieved by overmolding the piston walls 13 around the seal 24, which is previously molded through a separate process. The seal 24 is formed from an elastomeric material and the piston walls 13 are formed from plastic material. The piston walls 13 adhere at least partially around the seal 24 to created an integrated component. A seal seat 25 can be shaped into the piston walls 13 during the molding process to help provide support for the seal 24 during operation of the air spring 10'. The seal seat 25 may extend inwardly toward the center of the piston 12'. However, once assembled some clearance between the seal seat 25 and the damper assembly 14 would be present, such that the contact between the damper 14' and the piston 12' is by way of the sealing lip 26.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of manufacturing a piston assembly, comprising:
   forming a seal using an injection mold form;
   forming piston walls at least partially surrounding the seal with the injection molding form to create an integrated piston assembly;
   assembling the piston around a damper assembly, such that an air chamber is at least partially defined by the piston assembly and the damper assembly; and
   wherein a sealing lip extending from the seal is in contact with the damper assembly to seal the air chamber.

2. The method of claim 1, further comprising increasing the force on the sealing lip toward the damper assembly with the air in the air chamber.

* * * * *